(12) United States Patent
Fukushima (10) Patent No.: US 7,667,360 B2
(45) Date of Patent: Feb. 23, 2010

(54) ROTOR UNIT, BEARING MECHANISM, MOTOR, AND DATA STORAGE DISK DRIVE DEVICE

(75) Inventor: Kazuhiko Fukushima, Kyoto (JP)

(73) Assignee: Nidec Corporation, Kyoto (JP)

( * ) Notice: Subject to any disclaimer, the term of this patent is extended or adjusted under 35 U.S.C. 154(b) by 20 days.

(21) Appl. No.: 11/697,608

(22) Filed: Apr. 6, 2007

(65) Prior Publication Data

US 2007/0236091 A1 Oct. 11, 2007

(30) Foreign Application Priority Data

Apr. 6, 2006 (JP) ............................ 2006-105165

(51) Int. Cl.
*H02K 5/16* (2006.01)

(52) U.S. Cl. ..................................................... 310/90

(58) Field of Classification Search .................. 310/90, 310/91

See application file for complete search history.

(56) References Cited

U.S. PATENT DOCUMENTS

| | | | |
|---|---|---|---|
| 3,641,865 A | 2/1972 | Swindt et al. | |
| 4,377,762 A | 3/1983 | Tatsumi et al. | |
| 4,779,165 A * | 10/1988 | Elsaesser et al. | 360/97.02 |
| 4,996,613 A | 2/1991 | Hishida | |
| 5,459,361 A | 10/1995 | Morioka | |
| 5,663,602 A | 9/1997 | Shimizu et al. | |
| 6,124,657 A * | 9/2000 | Yamashita et al. | 310/90 |
| 6,252,322 B1 | 6/2001 | Kawawada et al. | |
| 6,339,273 B1 | 1/2002 | Higuchi | |
| 6,501,617 B1 | 12/2002 | Harada et al. | |
| 6,534,889 B2 | 3/2003 | Katagiri et al. | |
| 6,657,340 B2 | 12/2003 | Obara | |
| 6,700,256 B2 | 3/2004 | Fukutani et al. | |
| 6,707,640 B2 | 3/2004 | Nishio et al. | |
| 6,771,461 B2 | 8/2004 | Parsoneault | |
| 6,894,817 B2 | 5/2005 | Matsui et al. | |
| 6,897,585 B2 * | 5/2005 | Lee et al. | 310/90 |
| 6,980,394 B2 * | 12/2005 | Inoue et al. | 360/99.08 |
| 7,068,466 B2 | 6/2006 | Kull | |
| 2004/0071504 A1 | 4/2004 | Harada | |
| 2005/0006965 A1 * | 1/2005 | Sato et al. | 310/67 R |
| 2005/0278938 A1 | 12/2005 | Harada | |

FOREIGN PATENT DOCUMENTS

| | | |
|---|---|---|
| EP | 1 074 753 A1 | 2/2001 |
| JP | 60-124423 A | 7/1985 |
| JP | 61-042444 A | 2/1986 |
| JP | 62-78063 U | 5/1987 |
| JP | 01-69359 U | 5/1989 |
| JP | 03-106521 A | 5/1991 |

(Continued)

*Primary Examiner*—Nguyen N Hanh
(74) *Attorney, Agent, or Firm*—Keating & Bennett, LLP (57) ABSTRACT

In bearing mechanism for a motor spinning a storage disk about a center axis, an interference-fit portion of a shaft is interference-fitted into a through hole of a bushing from an axial lower side thereof such that the shaft is fixed to a rotor hub. The interference-fit portion of the shaft is defined with an upper section, a lower section, and a concave portion. When the shaft is interference-fitted into the bushing, the upper and lower sections engage with the bushing, and the concave portion radially faces an inner surface of the bushing with a gap defined therebetween.

16 Claims, 8 Drawing Sheets

FOREIGN PATENT DOCUMENTS

| | | |
|---|---|---|
| JP | 04-222432 A | 8/1992 |
| JP | 5-50956 U | 7/1993 |
| JP | 06-038443 A | 2/1994 |
| JP | 06-086498 A | 3/1994 |
| JP | 10-196515 A | 7/1998 |
| JP | 11-120743 A | 4/1999 |
| JP | 11-273236 A | 10/1999 |
| JP | 2000-170858 A | 6/2000 |
| JP | 2001-054268 A | 2/2001 |
| JP | 3155363 B2 | 4/2001 |
| JP | 2001-178078 A | 6/2001 |
| JP | 3177009 B2 | 6/2001 |
| JP | 2002-017063 A | 1/2002 |
| JP | 2002-136031 A | 5/2002 |
| JP | 2003-204651 A | 7/2003 |
| JP | 2003-206943 A | 7/2003 |
| JP | 2004-122209 A | 4/2004 |
| JP | 3515008 B2 | 4/2004 |
| JP | 2005-226657 A | 8/2005 |
| JP | 3868361 B2 | 1/2007 |

* cited by examiner

ROTOR UNIT, BEARING MECHANISM, MOTOR, AND DATA STORAGE DISK DRIVE DEVICE

BACKGROUND OF THE INVENTION

1. Field of the Invention

The present invention generally relates to a rotor unit to which a storage disk is fixed, a motor including the rotor unit, and a storage disk drive including the motor.

2. Description of the Related Art

A storage disk drive such as a hard disk conventionally includes a spindle motor for rotationally driving the storage disk(s) arranged on a rotor hub of the spindle motor (such spindle motors will be simply referred to as a motors hereinafter). One bearing mechanism that has been used in the motor is a fluid dynamic-pressure bearing mechanism (hereinafter simply referred to as FDB), in which the hydrodynamic pressure induced in lubricating oil retained between a stator unit (e.g., a sleeve unit fixed to a base plate of the motor) and a rotor unit (e.g., a shaft fixed to the rotor hub and inserted into the sleeve) is used for rotatably supporting the rotor unit.

Generally, in the manufacture of the motor, the shaft is loosely fitted into a mounting hole arranged in the rotor hub and then is fixed to the rotor hub with an adhesive. Alternatively, the shaft is interference-fitted into the mounting hole. If the adhesive is used for fixing the shaft and the rotor hub, the shaft and the rotor hub need to be retained on a jig until the adhesive hardens. When a portion of the shaft that is interference-fitted to the rotor hub has an axially shorter length, the shaft is not firmly fixed to the rotor hub and the perpendicular orientation of the shaft relative to the rotor hub may be degenerated. By making the portion of the shaft that is interference-fitted to the rotor hub axially longer, excessive load is applied to the shaft, deforming the shaft upon interference-fitting thereof. The deformed shaft may degrade the perpendicularity of the rotor hub, and the lubricating oil used in a bearing mechanism of the motor may leak to the outside of the motor along an outer circumferential surface of the deformed shaft.

SUMMARY OF THE INVENTION

In order to overcome the problems described above, preferred embodiments of the present invention provide a bearing mechanism used for a motor to spin a storage disk driving device, wherein force applied to the shaft to interference-fit the shaft into a bushing of the rotor hub is adjusted and the perpendicular orientation of the shaft relative to the rotor hub is reliably maintained.

A bearing mechanism according to a preferred embodiment of the present invention includes a rotor unit having a bushing and a shaft, a sleeve into which the shaft is inserted, and a lubricating oil filling gaps defined between the sleeve and the shaft and between the bushing and the sleeve. An axial upper portion of the shaft is interference-fitted in a through hole defined by an inner circumferential surface of the bushing, and at least one of the inner circumferential surface of the bushing and the upper portion of the shaft includes a concave portion extending along a circumferential direction.

Through the configuration mentioned above, friction between the shaft and the bushing during the interference-fitting is reduced, and the shaft and the bushing are firmly fixed to each other while the force of interference-fitting the shaft into the bushing is preferably adjusted.

Other features, elements, steps, processes, characteristics and advantages of the present invention will become more apparent from the following detailed description of preferred embodiments of the present invention with reference to the attached drawings.

DETAILED DESCRIPTION OF PREFERRED EMBODIMENTS

Referring to FIGS. 1 through 7, preferred embodiments of the present invention will be described in detail. It should be noted that in the explanation of preferred embodiments of the present invention, when positional relationships among and orientations of the different components are described as being up/down, left/right, or the like ultimately positional relationships and orientations that are in the drawings are indicated; positional relationships among and orientations of the components once having been assembled into an actual device are not indicated. In the following description, an axial direction indicates a longitudinal direction of a rotation axis, and a radial direction indicates a direction that is perpendicular or substantially perpendicular to the rotational, or center, axis of the motor.

Figure 1:
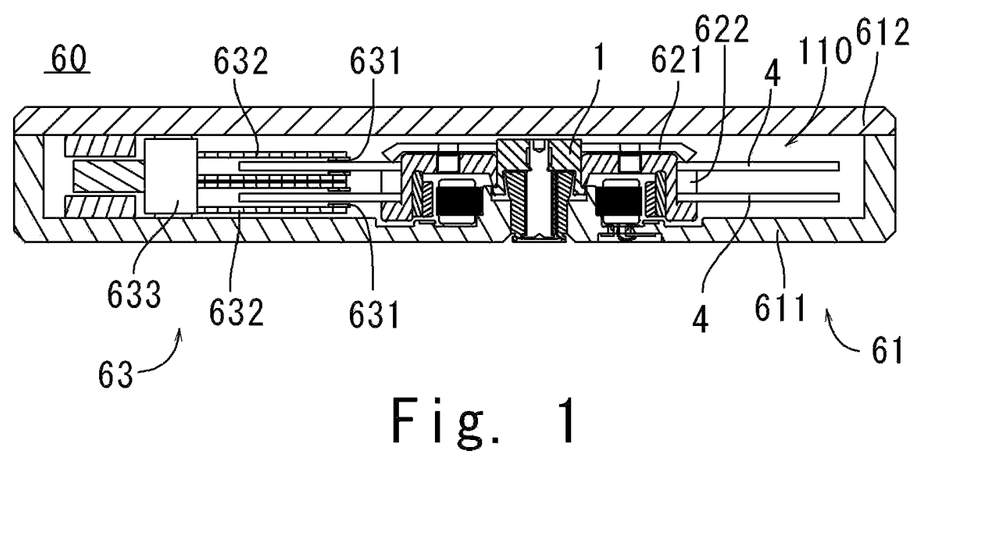
FIG. 1 is a drawing illustrating an internal configuration of a storage disk drive according to a first preferred embodiment of the present invention.

With reference to FIG. 1, the internal configuration of a storage disk drive 60, according to a first preferred embodiment of the present invention, including an electrically powered spindle motor 1 (hereinafter simply referred to as a motor 1) will be described. The storage disk drive 60 is preferably a hard disk drive (HDD), and includes a discoid shaped storage disk 4 for storing information; an access unit 63 for writing information onto and/or reading information from the storage disk 4; the motor 1 arranged to spin the storage disk 4; and a housing 61 having an interior space 110 accommodating the storage disk 4, the access unit 63, and the motor 1.

As illustrated in FIG. 1, the housing 61 includes a first housing component 611 having a box shape with an opening in the axial upper side thereof and supporting the motor 1 and the access unit 63 on a base thereof. The housing 61 also includes a plate-like second housing component 612 covering the opening in the first housing component 611 so as to define the interior space 110. Thus, in the storage disk drive 60, the housing 61 is defined by joining the second housing component 612 to the first housing component 611, wherein the interior space 110 is a clean chamber where dust and debris are extremely slight.

In the present preferred embodiment of the present invention, two storage disks 4 are attached to the motor 1. The storage disks 4 are spaced axially apart from each other with a spacer 622 arranged therebetween, and are arranged onto the motor 1 and fixed thereto by a clamp 621. The access unit 63 includes a head 631 adjoining the storage disk 4 for magnetically writing information onto and reading information from the storage disk 4, an arm 632 supporting the head 631, and a head-shifting mechanism 633 for shifting the arms 632 to vary the position of the head 631 relative to the storage disk 4. Through the configuration of these components, the heads 631 are moved into the required locations adjacent to the spinning recording disk 4 to conduct the reading and writing of information on the storage disk 4.

Figure 2:
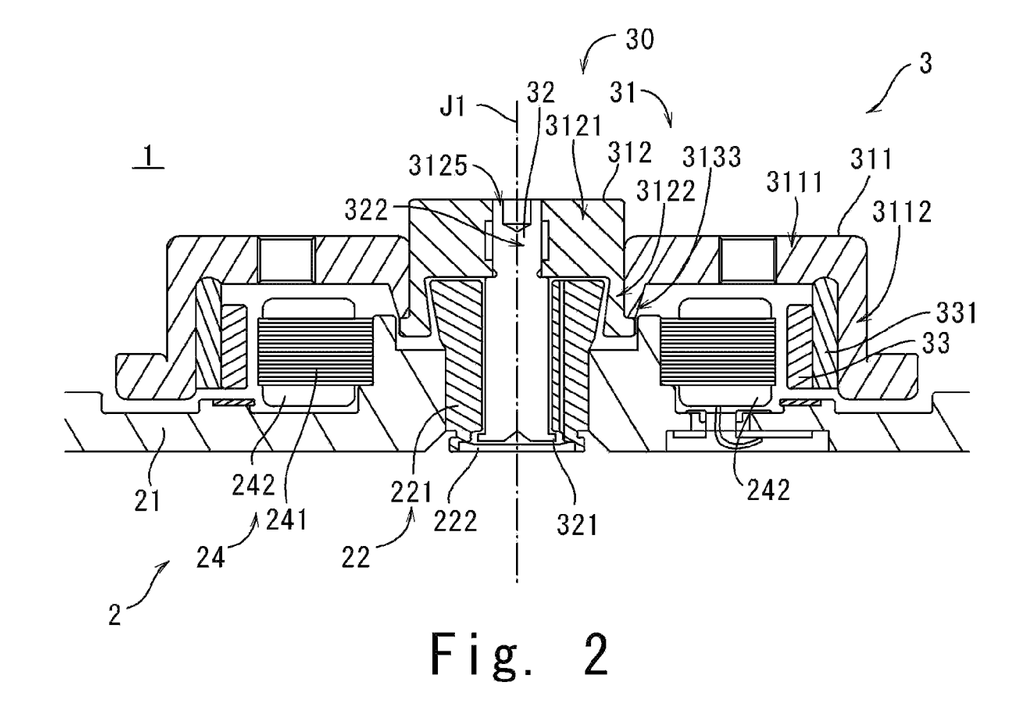
FIG. 2 is a vertical sectional view illustrating a configuration of a motor according to the first preferred embodiment of the present invention.

The description now turns to FIG. 2 which is a vertical sectional view illustrating the configuration of the motor 1 for rotating the storage disk 4 in the storage disk drive 60. As illustrated in FIG. 2, the motor 1 is an inner rotor type motor, and includes a stator unit 2 and a rotor unit 3. The rotor unit 3 is supported via a bearing mechanism that uses hydrodynamic pressure provided by lubricant oil (i.e., a fluid dynamic bearing (FDB)) such that the rotor unit 3 is rotatable relative to the stator unit 2 around a center axis J1 of the motor 1. For convenience in the following explanation, the rotor unit 3 side of the motor 1 will be described as an upper side and the stator unit 2 side as a lower side, but the center axis J1 need not necessarily coincide with the direction of gravity.

The stator unit 2 includes a base plate 21 which retains various parts of the stator unit 2, a cylindrical sleeve unit 22 which is a part of the bearing mechanism rotatably supporting the rotor unit 3 and having a substantially cylindrical shape whose lower end is closed, and an armature 24 supported by the base plate 21 at a position radially outside of the sleeve unit 22.

The base plate 21 is preferably a portion of the first housing component 611 (see FIG. 1) and is integral with other portions of the first housing component 611 by pressing aluminum, aluminum alloy, or any other suitable magnetic or non-magnetic ferrous metal sheet material. The sleeve unit 22 includes a sleeve 221 having a substantially cylindrical shape into which a shaft 32 attached to the rotor unit 3 is inserted and a sealing cap 222 closing the lower end of the sleeve 221. A bottom end of the sleeve unit 22 is interference-fitted into an opening arranged in the base plate 21 and is fixed to the base plate 21. The armature 24 includes a core 241 that is preferably made by laminating a plurality of silicon steel plates and a plurality of coils 242 defined by winding wires around a plurality of teeth provided on the core 241.

The rotor unit 3 includes a rotor hub 31 which supports the storage disk 4 and the various parts defining the rotor unit 3, the shaft 32 which extends axially downwardly from the rotor hub 31 and has a substantially columnar shape centered on the center axis J1, and a magnet 33 attached to the rotor hub 31 via a cylindrical rotor yoke 331 and encircling the center axis J1. The magnet 33 is a circular multipolar magnet and generates a rotational force (torque) centered on the center axis J1 between itself and the armature 24.

The rotor hub 31 includes a hub body 311 and a bushing 312. The hub body 311 is preferably made of an aluminum material, aluminum alloy material, or the like, and includes an annular portion 3111, an outer cylindrical portion 3112 extending axially downwardly from a radial outer end of the annular portion 3111, an inner cylindrical portion 3133 extending axially downwardly from a radial inner end, and a through hole defined by a radial inner surface of the inner cylindrical portion 3133. The bushing 312 has a substantially cylindrical shape and is inserted into the through hole. The rotor yoke 331 made of ferromagnetic material (e.g., stainless steel material) is retained on a radial inner surface of the outer cylindrical portion 3112.

The bushing 312 is preferably made of stainless steel material and includes a discoid shaped portion 3121 and a cylindrical bushing portion 3122 extending axially downwardly from a radial outer end of the discoid shaped portion 3121. The discoid shaped portion 3121 includes a through hole 3125 centered on the center axis J1 and axially penetrating the discoid shaped portion 3121.

The shaft 32 includes a substantially discoid shaped thrust plate 321 attached to the lower end of the shaft 32, and is made of stainless steel material. In the present preferred embodiment of the present invention, an upper portion of the shaft 32 is interference-fitted into the through hole 3125 along the center axis J1 for fixing the shaft 32 to the rotor hub 31. Hereinafter, the upper portion of the shaft 32 to be interference-fitted into the through hole 3125 is referred to as an interference-fit portion 322. The rotor hub 31 and the shaft 32 together are referred to as a rotor assembly 30. The term "interference-fit" in the preferred embodiments of the present invention means a fastening between two or more components which is achieved by friction after the parts are pushed together. For example, an interference-fit may include press-fitting, shrink-fitting, and the like.

The shaft 32 and the bushing 312 are preferably made of the same material as each other (e.g., stainless steel material, aluminum material, or aluminum alloy material) to equalize coefficients of thermal expansion with each other. Through the configuration mentioned above, it is possible to minimize the deformation between the shaft 32 and the bushing 312 thereby firmly fixing the shaft 32 and the bushing 312. Additionally, it is preferable that the shaft 32 and the bushing 312 are made of a stainless steel material to preferably maintain the hardness thereof.

Figure 3:
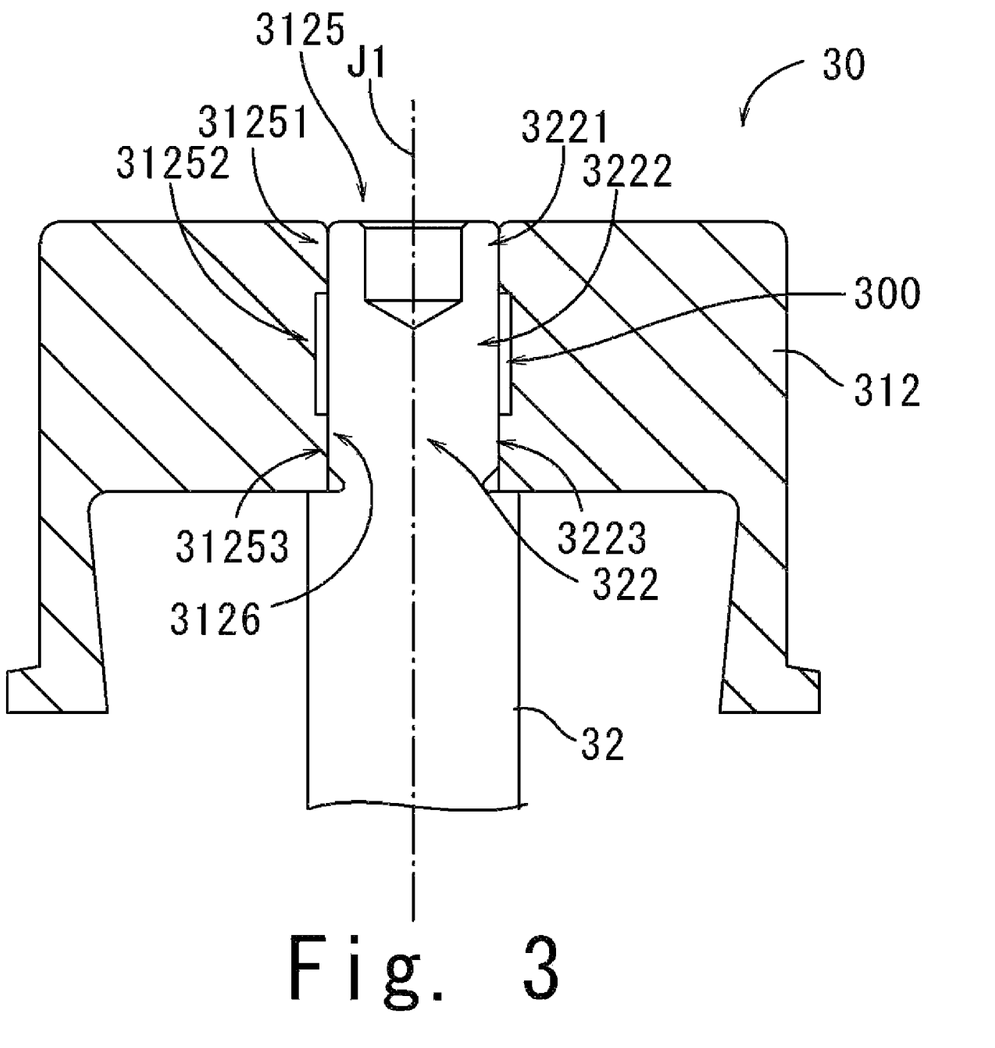
FIG. 3 is a magnified view illustrating a portion of a rotor unit to be arranged on a bearing mechanism.

FIG. 3 is a magnified view illustrating the through hole 3125 and the interference-fit portion 322 of the rotor assembly 30. As illustrated in FIG. 3, a radial inner surface 3126 of the discoid shaped portion 3121, which defines the through hole 3125, includes a concave portion 31252 arranged axially between an upper section 31251 and a lower section 31253 of the inner surface 3126. At the concave portion 31252, an inner diameter of the inner surface 3126 is greater than the inner diameter of the upper section 31251 and the lower section 31253. A diameter of the shaft 32 is substantially the same across the interference-fit portion 322. A portion of the interference-fit portion 322 of the shaft 32 opposing the upper section 31251 of the inner surface 3126 is referred to as an upper shaft section 3221. A portion of the interference-fit portion 322 opposing the concave portion 31252 is referred to as a middle shaft section 3222, and a portion of the interference-fit portion 322 opposing the lower section 31253 is referred to as a lower shaft section 3223.

The diameter of the interference-fit portion 322 of the shaft 32 is preferably slightly greater than the inner diameter of the upper section 31251 and the lower section 31251 but smaller than the inner diameter of the concave portion 31252. Thus, when the interference-fit portion 322 of the shaft 32 is interference-fitted into the through hole 3125, the upper shaft section 3221 and the lower shaft section 3223 are abutted against the inner surface 3126 of the discoid shaped portion 3121, but the middle shaft section 3222 opposes the inner surface 3126 without abutting against thereto.

The upper shaft section 3221 and the lower shaft section 3223 have substantially the same axial length as each other. The middle shaft section 3222 of the interference-fit portion 322 is arranged axially between the upper shaft section 3221 and the lower shaft section 3223 and is not abutted against the inner surface 3126 defining the through hole 3125. Thus, a gap 300 is defined between the middle shaft section 3222 and the inner surface 3126.

In the motor 1 illustrated in FIG. 2, micro-gaps are provided in between the inner surface of the cylindrical bushing portion 3122 and the outer surface of the sleeve 221, in between the lower surface of the discoid shaped portion 3121 of the rotor assembly 30 and the upper surface of the sleeve 221, in between the inner surface of the sleeve 221 and the outer surface of the shaft 32, in between the upper surface of the thrust plate 321 and the lower surface of the sleeve 221, and in between the lower surface of the thrust plate 321 and the upper surface of the sealing cap 222. The micro-gaps are continuous, and with oil thus being retained without interruption in the continuous micro-gaps, a bearing mechanism is defined.

Diameters of the outer surface of the sleeve 221 and the inner surface of the cylindrical bushing portion 3122 gradually expand toward the axial upper direction along the center axis J1. Thus, as illustrated in FIG. 2, in the cross section along the center axis J1, the outer surface of the sleeve 221 is inclined from the center axis J1 at an angle of about 2 degrees to about 30 degrees, preferably about 5 degrees to about 20 degrees, and the inner surface of the cylindrical bushing portion 3122 is inclined from the center axis J1 at an angle of about 0 to about 20 degrees, preferably about 5 degrees to about 10 degrees. In the motor 1, a so called "taper-seal section", at which a gap defined between the inner surface of the bushing 3122 and the outer surface of the sleeve 221 gradually expands along the axial downward direction, is defined between the cylindrical bushing portion 3122 and the sleeve 221, whereby the gap functions as an oil buffer preventing outflow of the lubricating oil.

In the lower surface of the sleeve 221, grooves (for example, grooves in spiral form) are formed for developing in the lubricating oil pressure directed toward the center axis J1 when the rotor unit 3 spins, wherein a thrust dynamic-pressure bearing section is defined by the lower surface of the sleeve 221 and the upper surface of the thrust plate 321 opposed thereto. Additionally, grooves (for example, herringbone grooves provided in upper and lower sections of the inner surface of the sleeve 221) for developing hydrodynamic pressure in the lubricating oil are formed in the surface(s) of the shaft 311 and/or the sleeve 221 opposing each other, wherein a radial dynamic-pressure bearing section is defined by the surfaces opposing each other.

In the motor 1, because the rotor unit 3 is supported in a non-contact manner via the lubricating oil by the fluid dynamic bearing mechanism, the storage disk 4 arranged on the rotor unit 3 is able to spin with high precision and low noise.

Figure 4:
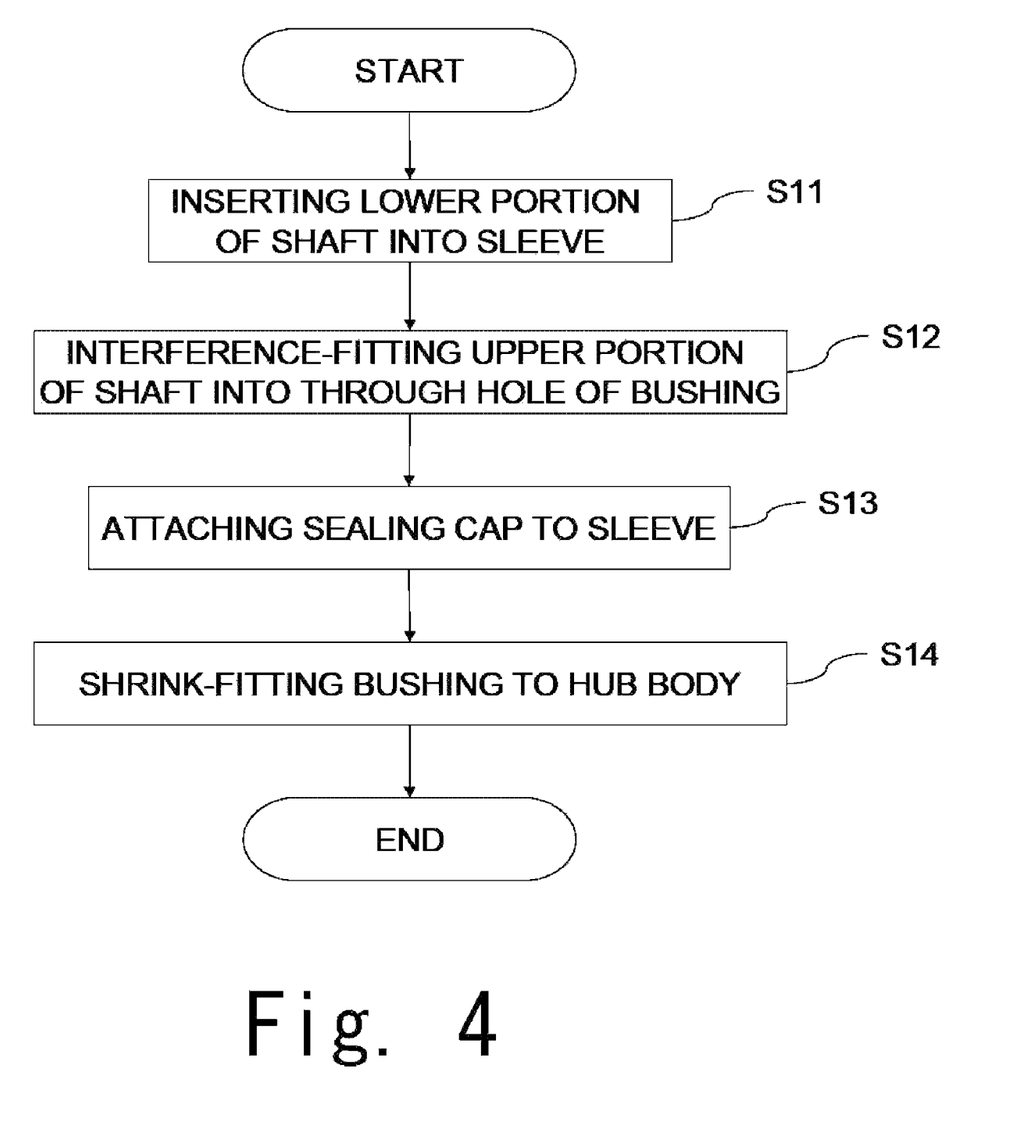
FIG. 4 is a chart setting forth a process flow in the manufacture of a rotor unit to be arranged on a bearing mechanism.
Figure 5A:
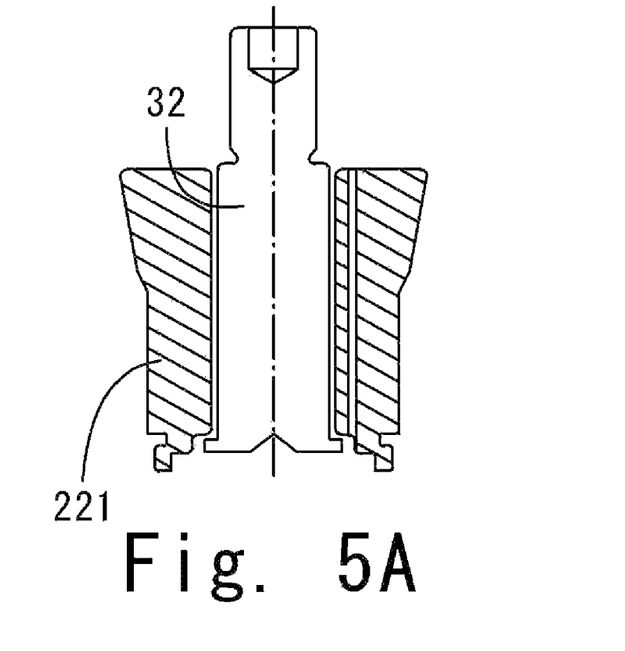
FIG. 5A is a sectional view illustrating a workpiece of the rotor unit in one manufacturing step thereof.
Figure 5B:
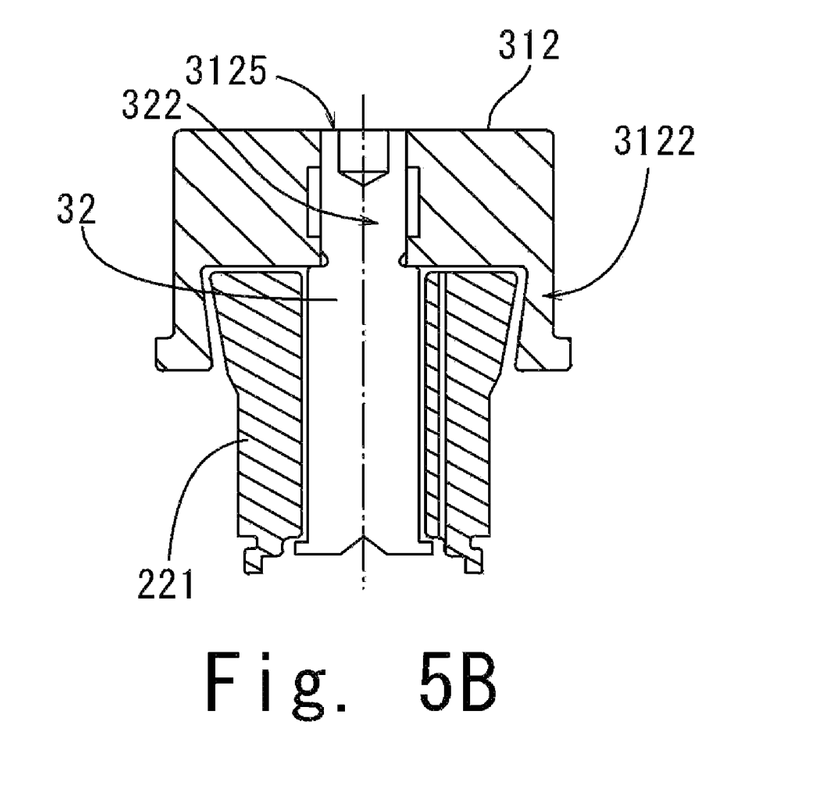
FIG. 5B is a sectional view illustrating a workpiece of the rotor unit in another manufacturing step thereof.
Figure 5C:
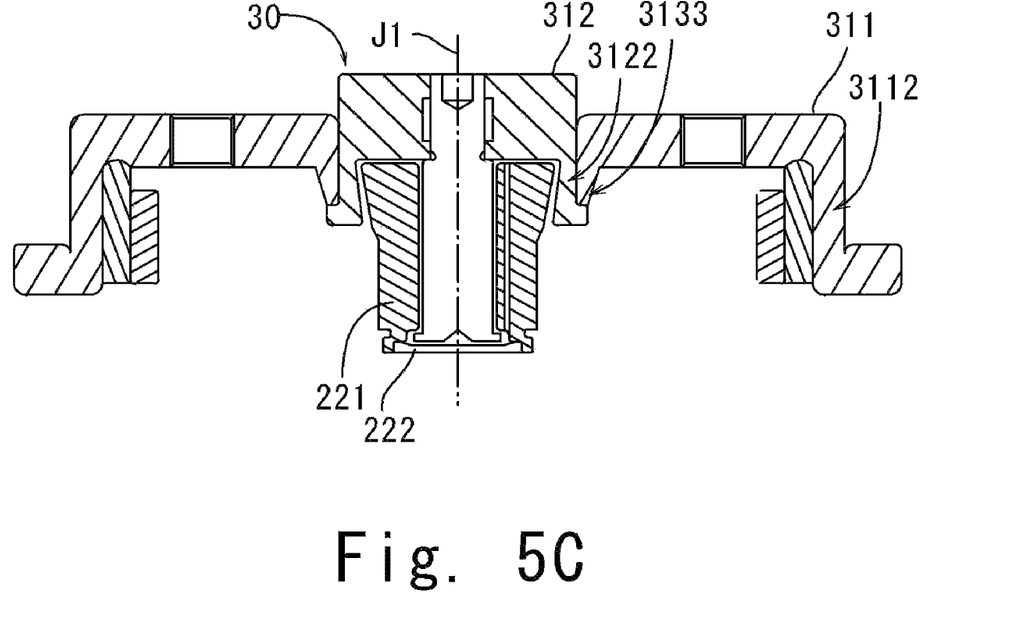
FIG. 5C is a sectional view illustrating a workpiece of the rotor unit in yet another manufacturing step thereof.

Next, manufacturing of the rotor assembly 30 will be explained. FIG. 4 is a chart setting forth a process flow for manufacturing of the rotor assembly 30. FIGS. 5A to 5C are views illustrating a work piece in the manufacturing of the rotor assembly 30. In the manufacturing of the rotor assembly 30, as illustrated in FIG. 5A, the shaft 32 is first inserted into the sleeve 221 from the axial lower side of the sleeve (step S11).

Second, as illustrated in FIG. 5B, the interference-fit portion 322 of the shaft 32 is interference-fitted into the through hole 3125 of the bushing 312 from the axial lower side of the bushing 312 to fix the shaft 32 to the bushing 312 (step S12). When the shaft 32 is interference-fitted into the through hole 3125, the upper shaft section 3221 and the lower shaft section 3223 are in friction contact with the inner surface 3126 of the bushing 312, as illustrated in FIG. 3. The inner diameter of the cylindrical bushing portion 3122 is greater than the outer diameter of the sleeve 221, thus, the cylindrical bushing portion 3122 does not engage with the sleeve 221 when the shaft 32 is interference-fitted into the bushing 312.

In the following step, the sealing cap 222 is laser welded to the sleeve 221 to seal the lower end of the sleeve 221 as illustrated in FIG. 5C (step S13). Then, the bushing 312 is inserted into the inner cylindrical portion 3133 of the hub body 311 from the axial lower side of the hub body 311, wherein the hub body 311 has been heated beforehand to thermally expand the inner diameter of the inner cylindrical portion 3133. Due to the thermal expansion, the inner diameter of the inner cylindrical portion 311 of the heated hub body 311 will be greater than that the outer diameter of the bushing 312, thus, the bushing 312 is inserted into the heated hub body 312 with the outer surface of the bushing 312 and the inner surface of the inner cylindrical portion 3133 facing each other.

After the bushing is inserted, the hub body 311 is cooled and thermally shrunken such that the outer surface of the bushing 312 abuts against the inner surface of the inner cylindrical portion 3133 of the hub body 311 to radially inwardly tighten the bushing 312 with the hub body 311. As the inner cylindrical portion 3133 of the hub body 311 is shrunken, the cylindrical bushing portion 3122 is radially inwardly pushed by the hub body 311 and is radially inwardly deformed. Thus, the inner surface of the cylindrical bushing portion 3122 is radially inwardly inclined, and at last, the inner surface of the cylindrical bushing portion 3122 is inclined from the center axis J1 at an angle of about 0 to about 20 degrees (preferably about 5 to about 10 degrees), thus defining the taper-seal section with the outer surface of the sleeve 221. As described above, the bushing 312 is shrink-fitted into the hub body 311, and manufacturing of the rotor assembly 30 is finished (step S14).

As described above, in the motor 1, when the shaft 32 is interference-fitted into the through hole 3125, the upper shaft section 3221 and the lower shaft section 3223 are in friction contact with the inner surface 3126 defining the through hole 3125. By configuring the axial length of the upper shaft section 3221 and the lower shaft section 3223, the force required to interference-fit the shaft 32 into the bushing 312 is adjusted. Thus, it is possible to prevent the shaft 32 from being deformed by an excessive load applied thereto.

In addition, by providing the middle shaft portion 3222, which radially opposes the bushing 312 without abutting thereto, to the shaft 32 axially between the upper shaft section 3221 and the lower shaft section 3223, the axial length of the interference-fit portion 322 of the shaft 32 may be made longer without increasing the force applied to the shaft 32 when interference-fitting the shaft 32 into the bushing 312. Through the configuration just described above, the perpendicular orientation of the shaft 32 relative to the rotor hub 31 may be preferably maintained. In addition, with the configuration mentioned above, the shaft 32 is prevented from being inclined when the external load is applied to the rotor hub 31 of the rotor assembly 30.

As is evident from the above, in the rotor assembly 30 of the motor 1, the perpendicular orientation of the shaft 32 relative to the rotor hub 31 is improved while the force required to interference-fit the shaft 32 into the bushing 312 is preferably adjusted. Thus, the storage disk 4 arranged on the rotor assembly 30 is rotated in a manner perpendicular to the center axis J1 enabling reliable writing of information onto and/or reading information from the storage disk 4 in the storage disk drive 60.

In manufacturing of the rotor assembly 30, the cylindrical bushing portion 3122 is radially inwardly deformed and the taper-seal section is formed when the bushing 312 is shrink-fitted into the hub body 311. Thus, the taper-seal section is formed during the shrink-fitting of the bushing 312, facilitating the manufacturing of the rotor assembly 30. In addition, forming the taper-seal section during the shrink-fitting of the bushing 312 into the hub body 311 enables the inner surface of the cylindrical bushing portion 3122 to be more inclined relative to the center axis J1 compared with that of simply fitting the bushing 312 into the hub body 311, thereby preventing outflow of the lubricating oil.

Figure 6:
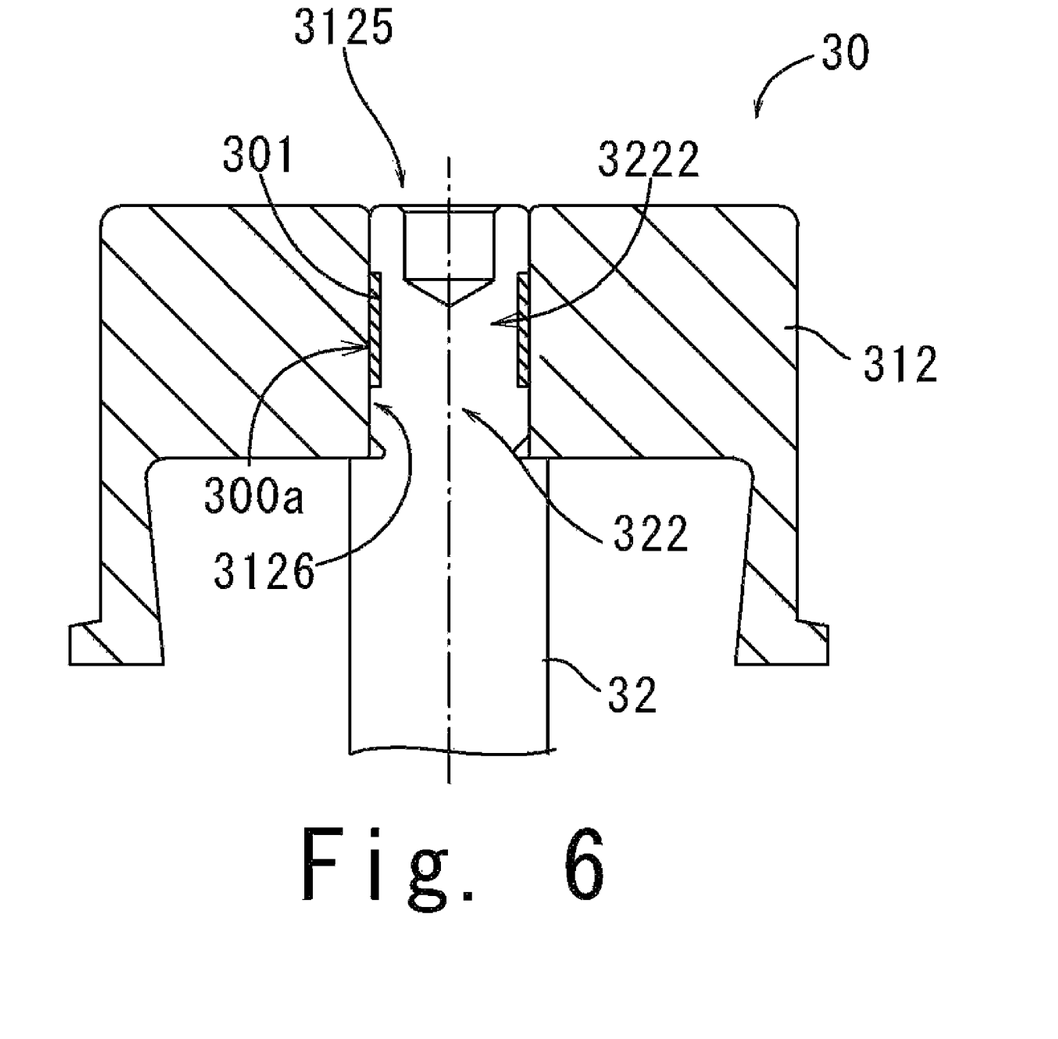
FIG. 6 is a magnified view illustrating a portion of a rotor unit according to a second preferred embodiment of the present invention.

Next, a motor according to a second preferred embodiment of the present invention will be described in detail. FIG. 6 is a magnified view illustrating the bushing 312 and the interference-fit portion 322 of the shaft 32 fitted into the through hole 3125 of the bushing 312. In the motor according to the second preferred embodiment of the present invention, the diameter of the through hole 3125 is substantially the same across the entire section thereof. The shaft 32 includes the upper shaft section 3221 and the lower shaft section 3223, having substantially the same diameters as each other, and also includes the middle shaft section 3222 having a smaller diameter than the diameter of the upper shaft section 3221 and the lower shaft section 3223 (i.e., the middle shaft section is a concave portion arranged axially between the upper shaft section 3221 and the lower shaft section 3223). Thus, the middle shaft section 3222 radially opposes the inner surface 3126 defining the through hole 3125 with a small gap 300a defined therebetween. In the present preferred embodiment of the present invention, an adhesive layer 301 adhering the inner surface 3126 and the interference-fit portion 322 is arranged in the small gap 300a between the middle shaft section 3222 and the inner surface 3126. The rest of the configurations are the same as those described in the first preferred embodiment of the present invention, and are labeled with the same reference numerals in the following description.

The manufacturing steps of the rotor assembly 30 are preferably the same as those described in the first preferred embodiment of the present invention, with the exception that a step in which the adhesive is applied to the middle shaft section 3222 of the interference-fit portion 322 is performed prior to the step S12 (preferably between the step S11 and the step S12).

As described in the first preferred embodiment of the present invention, in the rotor assembly 30 of the motor 1 according to the second preferred embodiment of the present invention, the perpendicular orientation of the rotor hub 31 relative to the shaft 32 is improved while the force required to interference-fit the shaft 32 into the bushing 312 is preferably adjusted.

In addition, since the adhesive layer 301 is arranged in the small gap 300a defined between the middle shaft section 3222 and the inner surface 3126 of the bushing 312, the shaft 32 is firmly fixed to the rotor hub 31. This prevents the outflow of the lubricating oil, retained in the bearing mechanism, through a joint between the shaft 32 and the rotor hub 31. Alternatively, the interference-fit portion 322 of the shaft 32 may have substantially the same diameter across the entire section thereof, and the adhesive layer 301 for firmly fixing the shaft 32 to the bushing 312 is arranged in the small gap 300a defined between the outer surface of the shaft 32 and the concave portion 31252 which has a greater diameter than the diameter of the upper section 31251 and the lower section 31253 of the inner surface 3126.

Since processing the outer surface of the shaft 32 is generally easier than processing the inner surface 3126 defining the through hole 3125 of the bushing 312, manufacturing of the rotor assembly 30 is facilitated by processing the shaft 32 to provide the middle shaft section 3222 having a smaller diameter than the diameter of the lower shaft section 3223 and the upper shaft section 3221.

Figure 7:
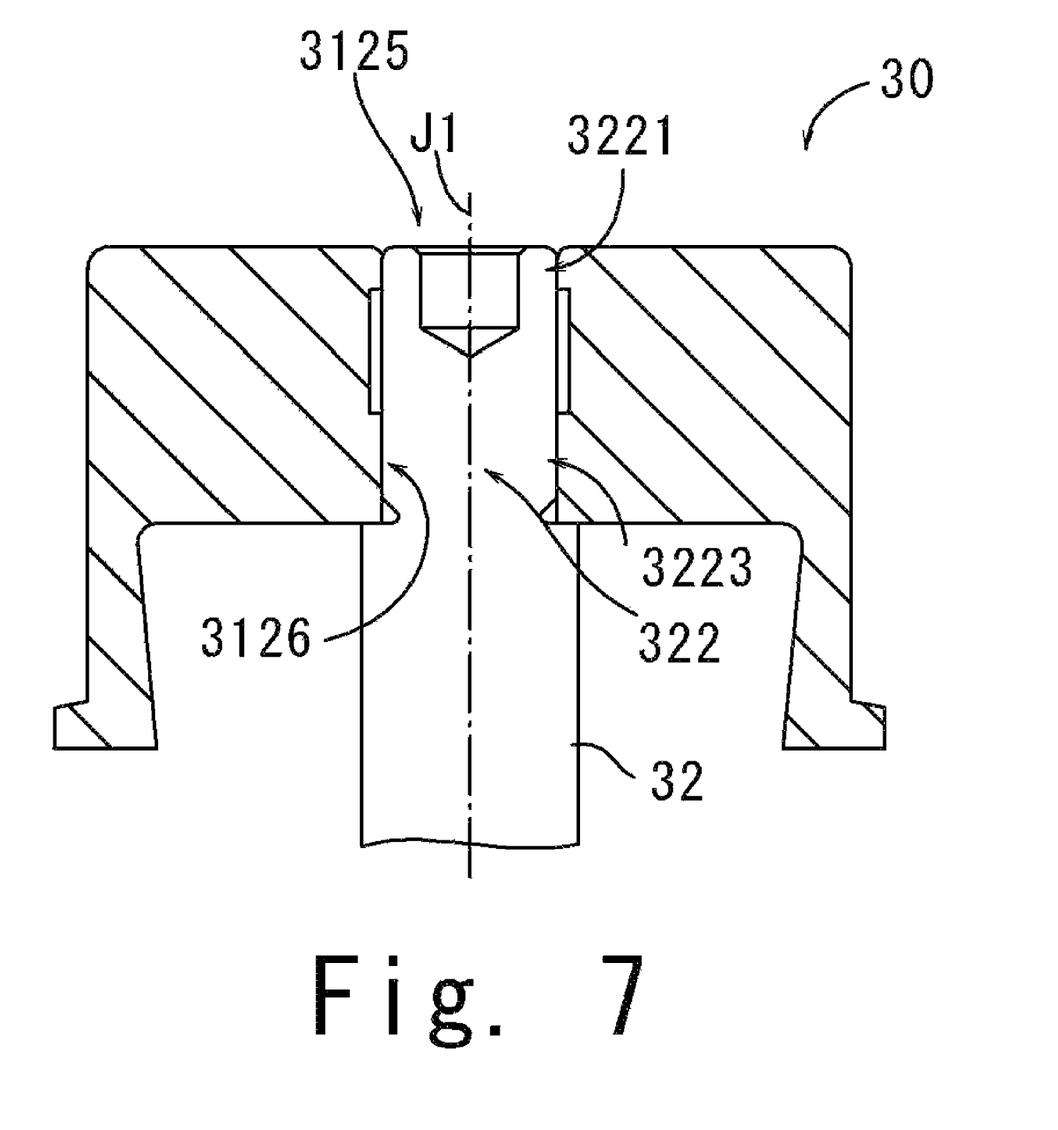
FIG. 7 is a magnified view illustrating a portion of a rotor unit according to a third preferred embodiment of the present invention.

Next, a motor according to a third preferred embodiment of the present invention will be described in detail. FIG. 7 is a magnified view illustrating a portion of a rotor assembly 30 according to a third preferred embodiment of the present invention, where the interference-fit portion 322 of the shaft 32 is fitted into the through hole 3125 of the bushing 312. In the motor 1 according to the third preferred embodiment of the present invention, the lower shaft section 3223 of the interference-fit portion 322 is axially longer than the upper shaft section 3221. The rest of the configurations are preferably the same as those described in the first preferred embodiment of the present invention, and are labeled with the same reference numerals in the following description.

As described in the first preferred embodiment of the present invention, in the rotor assembly 30 of the motor 1 according to the third preferred embodiment of the present invention, the perpendicular orientation of the rotor hub 31 relative to the shaft 32 is improved while the force required to interference-fit the shaft 32 into the bushing 312 is preferably adjusted.

In the motor 1 according to the third preferred embodiment of the present invention, the lower shaft section 3223 of the interference-fit portion 322 is configured to have a longer axial length than that of the upper shaft section 3221. When the shaft 32 is fitted into the rotor hub 31 from the lower side of the rotor hub 31, the upper shaft section 3221 is firstly inserted into the through hole 3125 of the rotor hub 31. Through this configuration, the lower shaft section 3223 having the axial length longer than that of the upper shaft section 3221 engages with the inner surface 3126 defining the 3125 for a short time, facilitating the fitting of the shaft 32 into the through hole 3125. In addition, in the present preferred embodiment of the present invention, the center of gravity of the rotor unit 3 is arranged around the lower shaft section 3223. Thus, by configuring the axial length of the lower shaft section or the upper shaft section near the center of gravity of the rotor unit 3 longer than the other, the shaft 32 and the rotor hub 31 are firmly fixed to each other.

While preferred embodiments of the present invention have been described in the foregoing, the present invention is not limited to the preferred embodiments detailed above, in that various modifications are possible.

In the preferred embodiments of the present invention, the upper and lower sections of the shaft or bushing preferably radially abut against the other, and the axial concave portion arranged axially between the upper and the lower sections are provided. It should be noted, however, the shaft or the bushing may include a plurality of portions abutting against the other and a plurality of concave portions. Alternatively, the interference-fit portion 322 of the shaft 32 may include a concave portion having a spiral shape.

The through hole 3125 into which the shaft 32 is fitted may not be a through hole axially penetrating the discoid shaped portion 3121 of the bushing 312. The shaft 32 may be fitted into a concave portion arranged in an axial lower surface of the discoid shaped portion 3121 of the bushing 312.

In the rotor assembly 30 according to the preferred embodiments of the present invention, the hub body 311 and the bushing 312 is preferably made of any suitable material, such as aluminum, aluminum alloy, stainless steel, copper, and the like. However, it is preferable that the shaft 32 and the bushing 312 are made of the same material as each other.

In the preferred embodiments of the present invention, the bushing 312 and the hub body 311 are preferably fixed to each other by shrink-fitting. However, the bushing 312 and the hub body 311 may be fixed to each other by any suitable method such as interference fitting or adhering. Alternatively, the hub body 311 and the bushing 312 may be integrally formed with each other.

In the motor according to the preferred embodiments of the present invention, the sleeve unit 22 may be defined by a substantially cylindrical sleeve and a sleeve housing arranged outside of the sleeve to accommodate it.

A motor of the preferred embodiments of the present invention does not necessarily have to be the outer-rotor type, in which the magnet 33 is disposed on the outside of the armature 24, but may an inner-rotor type in which the magnet 33 is disposed on the center-axis J1 side of the armature 24. Still another possible modification is that so-called air-pressure bearings, in which air serves as the working fluid, may be used as the bearing mechanism. Additionally, ball bearings and the like may be used for the bearing mechanism.

The motor according to the preferred embodiments of the present invention may be used for an optical disk drive, a magnetic optical disk drive and the like.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A bearing mechanism for a motor, comprising:
   a rotor unit including a bushing and a shaft fixedly attached to the bushing, the bushing having an inner circumferential surface defining an axially extending through hole centered about a center axis, an axial upper portion of the shaft being interference-fitted in the through hole, and the inner circumferential surface of the bushing includes a concave portion extending along a circumferential direction of the bushing;
   a sleeve having a substantially cylindrical shape and a closed axial lower end, an axial lower portion of the shaft being inserted into the lower end of the sleeve, and an axial upper portion of the sleeve axially facing the bushing radially outside of the shaft with a gap defined therebetween;
   lubricating oil filled in the gap defined between the axially upper portion of the sleeve and the bushing; and
   a rotor hub arranged to support a rotor magnet; wherein
   the rotor hub includes an inner lower edge fixedly attached to a top portion of a radially extending protrusion of the bushing;
   the bushing is made of a first material, the rotor hub is made of a second material, and the first material is more rigid than the second material;
   substantially no portion of the bushing axially overlaps with any axially uppermost surface of the rotor hub; and
   the rotor hub, the bushing, and the shaft all rotate together.

2. The bearing mechanism as set forth in claim 1, wherein the concave portion is arranged in the inner circumferential surface of the bushing, and the upper portion of the shaft has a diameter that is substantially the same across an entire axial section of the upper portion to have an interference-fit with the through hole.

3. The bearing mechanism as set forth in claim 2, wherein an adhesive is arranged in the concave portion of the inner circumferential surface of the bushing.

4. The bearing mechanism as set forth in claim 2, wherein the inner circumferential surface of the bushing includes an axial upper section arranged axially upward of the concave portion and an axial lower section arranged axially downward of the concave portion, and the axial upper section and the axial lower section engage with the shaft.

5. The bearing mechanism as set forth in claim 4, wherein the axial lower section has a longer axial length than that of the axial upper section.

6. The bearing mechanism as set forth in claim 4, wherein the axial upper section and the axial lower section have substantially the same axial length as each other.

7. The bearing mechanism as set forth in claim 1, wherein the concave portion is arranged in the outer circumferential surface of the upper portion of the shaft, and the inner circumferential surface of the bushing has a diameter that is substantially the same across an entire axial section into which the shaft is interference-fitted.

8. The bearing mechanism as set forth in claim 7, wherein an adhesive is arranged in the concave portion of the outer circumferential surface of the upper portion of the shaft.

9. The bearing mechanism as set forth in claim 7, wherein the upper portion of the shaft includes an axial upper section arranged axially upward of the concave portion and an axial lower section arranged axially downward of the concave portion, and the axial upper section and the axial lower section engage with the inner circumferential surface of the bushing.

10. The bearing mechanism as set forth in claim 9, wherein the axial lower section has a longer axial length than that of the axial upper section.

11. The bearing mechanism as set forth in claim 9, wherein the axial upper section and the axial lower section have substantially the same axial length as each other.

12. The bearing mechanism as set forth in claim 1, wherein the shaft and the bushing are made of stainless steel material.

13. A motor comprising:
   a base plate;
   the bearing mechanism as set forth in claim 1 attached to the base plate;
   an armature attached to the base plate radially outside of the bearing mechanism; wherein
   the rotor magnet supported by the rotor hub radially faces the armature with a small gap defined therebetween; wherein
   the rotor hub is shrink-fit to an outer circumferential surface of the bushing.

14. The bearing mechanism as set forth in claim 1, wherein the rotor hub is interference fitted to the outer circumferential surface of the bushing such that the bushing supports both the inner circumferential surface of the rotor hub, and a lower axial surface of the rotor hub.

15. The bearing mechanism as set forth in claim 1, wherein the bearing mechanism is a fluid dynamic-pressure bearing mechanism.

16. A bearing mechanism for a motor, comprising:
   a rotor unit including a bushing and a shaft fixedly attached to the bushing, the bushing having an inner circumferential surface defining an axially extending through hole centered about a center axis, an axial upper portion of the shaft being interference-fitted in the through hole, and the inner circumferential surface of the bushing includes a concave portion extending along a circumferential direction of the bushing;

a sleeve having a substantially cylindrical shape and a closed axial lower end, an axial lower portion of the shaft being inserted into the lower end of the sleeve, and an axial upper portion of the sleeve axially facing the bushing radially outside of the shaft with a gap defined between the axial upper portion of the sleeve and the bushing;

lubricating oil filled in the gap defined between the axially upper portion of the sleeve and the bushing; and a rotor hub arranged to support a rotor magnet; wherein both the bushing and the shaft are made of materials that are more rigid than the material that the rotor hub is made of;

substantially no portion of the bushing axially overlaps with any axially upper surface of the rotor hub; and the rotor hub, the bushing, and the shaft all rotate together.

* * * * *